United States Patent [19]
Hashida

[11] Patent Number: 5,988,772
[45] Date of Patent: Nov. 23, 1999

[54] HYDRAULIC CONTROL APPARATUS

[75] Inventor: Koichi Hashida, Itami, Japan

[73] Assignee: Sumitomo Electric Industries, Ltd., Osaka, Japan

[21] Appl. No.: 08/936,602

[22] Filed: Sep. 24, 1997

[30] Foreign Application Priority Data

Sep. 26, 1996 [JP] Japan ................................. 8-254262
Jun. 2, 1997 [JP] Japan ................................. 8-144003

[51] Int. Cl.⁶ .................................................. B60T 8/36
[52] U.S. Cl. ................................. 303/119.3; 137/596.17
[58] Field of Search ........................... 303/119.2, 119.3, 303/DIG. 10; 137/596.17, 870, 884

[56] References Cited

U.S. PATENT DOCUMENTS

| | | | |
|---|---|---|---|
| 5,127,440 | 7/1992 | Maas et al. | 137/884 |
| 5,160,116 | 11/1992 | Sugiura et al. | 137/596.17 |
| 5,542,755 | 8/1996 | Staib et al. | 303/119.2 |
| 5,688,028 | 11/1997 | Kohno et al. | 303/119.2 |
| 5,700,071 | 12/1997 | Steffes et al. | 303/119.2 |

FOREIGN PATENT DOCUMENTS

| | | |
|---|---|---|
| 0094610 | 11/1983 | European Pat. Off. . |
| 0728645 | 8/1996 | European Pat. Off. . |
| 3931761 | 4/1991 | Germany . |
| 4402735 | 8/1995 | Germany . |
| 4432165 | 3/1996 | Germany . |
| 5505446 | 8/1993 | Japan . |
| 9212878 | 8/1992 | WIPO . |

*Primary Examiner*—Robert J. Oberleitner
*Assistant Examiner*—Robert A. Siconolfi
*Attorney, Agent, or Firm*—Greenblum & Bernstein, P.L.C.

[57] ABSTRACT

In a solenoid valve, a coil is disposed on the electronic control side, and is resin injection molded integrally with a resin case housing a circuit board on which electronic components are mounted. Before a hydraulic control unit and electronic control unit are connected, an end of a connecting pin of the coil is electrically connected to wiring of the circuit board. A cover 20 of similar material is pressed and welded onto the resin case to assure a waterproof structure around the circuit board. Finally, a magnetic member or magnetic plate, constituting part of a magnetic circuit provided separately from or integrally molded with the resin case is fastened by a bolt to unitarily connect both units.

11 Claims, 8 Drawing Sheets

PRIOR ART

HYDRAULIC CONTROL APPARATUS

BACKGROUND OF THE INVENTION

1. Field of the Invention

The present invention relates to a hydraulic control apparatus integrally comprising a hydraulic control unit containing a solenoid valve, and an electronic control unit for controlling the hydraulic control unit. The hydraulic control apparatus, the hydraulic control apparatus of an antilock brake control system in a motor vehicle.

2. Description of the Related Art

When antilock brake control systems were first introduced in automobiles, the hydraulic control unit and electronic control unit were usually installed as separate units connected by a cable.

As shown in Japanese Tokuhyo No. H5-505446 (1993-505446), a hydraulic control apparatus integrally comprising a hydraulic control unit containing multiple are solenoid valves, and an electronic control unit for controlling the hydraulic control unit, was subsequently developed. This apparatus enabled cost and size reductions by eliminating the connector cable and associated connectors, and enabling the hydraulic control apparatus to be installed in a vehicle in a single operation.

This is shown in FIG. 13 of the present patent specification and described below.

An assembly comprising valve block 105 and valve dome 110 corresponds to the hydraulic control unit of the present specification. An assembly comprising electronic components 120 and 120' on a printed circuit board 119, a steel jacket 121 surrounding the outside of a coil 101 to create a magnetic field pattern, and a flexible molding 115 surrounding and securing these parts inside a cover 103, corresponds to the electronic control unit of the present specification.

In a hydraulic control apparatus integrally comprising such a hydraulic control unit and electronic control unit, the coils of the solenoid valves in the hydraulic control unit can be on the hydraulic control unit side or on the electronic control unit side.

When the coils are disposed on the hydraulic control unit side, the coil and electronic control unit must be connected by means of a disconnectable connector structure while the solenoid valve components are all attached to the hydraulic control unit. The structure of the solenoid valve is therefore substantially that of a conventional independent hydraulic control unit.

When the coils are disposed on the electronic control unit side, the coils and electronic circuitry can be directly connected. The problem in this case, however, is that the solenoid valve components become separated between the hydraulic control unit and electronic control unit. More specifically, because the magnetic circuit of the solenoid valves must be closed, a magnetic material must be provided both on the end of the coils connected to the hydraulic control unit and on the opposite end. However this part cannot be preformed as part of the hydraulic control unit, and must be provided with the coils on the electronic control unit side.

In the prior art example shown in FIG. 13, a steel jacket 121 subassembly is disposed as a magnetic member surrounding the coil 101, and must be connected to the printed circuit board 119. Note that there is no waterproof structure provided between the printed circuit board 119 and coil 101 at this stage. A lip seal 122 is therefore formed by covering these parts with a flexible molding 115 in a later process, resulting in a waterproof structure for the printed circuit board 119. Before these subassembly steps can be completed, however, the outside of the coil 101 must be insulated because the steel jacket 121 is connected to the coil 101.

This means that while the task of connecting cables to connect the hydraulic control unit with the electronic control unit is eliminated, the waterproofing means at the connection surface and the task of subassembling the coil 101 before fastening the two units together are not eliminated.

SUMMARY OF THE INVENTION

The object of the present invention is therefore to provide a hydraulic control apparatus having a structure whereby the step of subassembling the coil and steel jacket is eliminated. Thus a waterproof structure at the connection surface between the hydraulic control unit and electronic control unit is not needed.

According to an embodiment of the present invention, a hydraulic circuit part of the solenoid valves is formed on a hydraulic control unit side, and a solenoid valve coils are formed on an electronic control unit side. The coils are integrally molded at the same time the resin case of the electronic control unit side is formed. The moving part of the solenoid valve on the hydraulic control unit side is inserted to the through hole in the middle of the coil to form part of the closed magnetic circuit of the solenoid valve.

In addition, a magnetic member is attached from an opposite side of the hydraulic unit with the electronic control unit disposed therebetween. The magnetic member contacts a solenoid valve part inserted to the through hole in the middle of the coil, and extends from the outside of the electronic control unit to form the magnetic circuit of the hydraulic control unit.

According to another embodiment of the present invention, a moving part of each solenoid valve is formed on the hydraulic control unit side, and a coil of each solenoid valve is formed on the electronic control unit side. The coil is integrally molded simultaneously to form the resin case of the electronic control unit side. The moving part of the solenoid valve on the hydraulic control unit side is inserted in to the through hole in the middle of the coil to form part of the closed magnetic circuit of the solenoid valve as in the embodiment described above.

However, in this second embodiment a magnetic plate forming part of the magnetic circuit of the solenoid valve and the coil mounted on the magnetic plate are formed integrally with the resin case of the electronic control unit. Also, a circuit board housing space is formed in the resin case on the side opposite the coil. The magnetic plate is exposed where resin is not molded on part of the magnetic plate extending outside the circuit board housing space.

In both the first and second embodiment described above, if the mold prevent resin from being injected to the ends of the vehicle harness connector terminals and the coil board connecting pins projecting into the circuit board housing space inside the resin case when molding the resin case, interference with electrical connections to the electronic components can be avoided.

Furthermore, a coil subassembly process can be eliminated by forming the resin molding around the coil winding of each solenoid valve in the same injection molding process when molding the resin case.

In addition, a strong, waterproof structure can be achieved by molding the entire circuit board housing space on the inside of the resin case, including the magnetic plate, from resin.

The ability to fasten the hydraulic control unit to the electronic control unit can also be provided by opening a bolt hole in the magnetic member and the part of the magnetic plate extending outside the circuit board housing space.

Furthermore, in a hydraulic control apparatus having a moving part of a solenoid valve formed on the hydraulic control unit side, and a coil of the solenoid valve formed on the electronic control unit side, as a means for integrally comprising a hydraulic control unit containing a solenoid valve and an electronic control unit for controlling said hydraulic control unit, a first and a second magnetic plate forming common parts of a magnetic circuit for a plurality of solenoid valves are disposed on the hydraulic control unit side end and the opposite end of the coil. The first and second magnetic plate are connected to the hydraulic control unit (fastened, for example, with a bolt) with a magnetic member disposed between the first and second magnetic plates. The magnetic material on the outside of each coil can be eliminated in this case because the part of the magnetic circuit outside the coil is formed from the first and second magnetic plates and the magnetic material disposed therebetween.

Furthermore, in a hydraulic control apparatus comprising a plurality of coils, the direction of current flow through adjacent coils is mutually opposite such that the direction of current flow in approximately half the coils is opposite the direction of current flow in the remaining half of the coils. As a result, the magnetic fields generated by each of the coils are mutually cancelling.

BRIEF DESCRIPTION OF THE DRAWINGS

These and other objects and features of the present invention will become clear from the following description taken in conjunction with the preferred embodiment thereof and the accompanying drawings throughout in which like parts are designated by like reference numerals, and in which.

DETAILED DESCRIPTION OF THE PREFERRED EMBODIMENTS

To integrally connect a hydraulic control unit having a solenoid valve with an electronic control unit for controlling the hydraulic control unit, a moving part of a solenoid valve is formed on the hydraulic control unit side, and the coil of the solenoid valve is formed on the electronic control unit side. The resin case of the electronic control unit is formed by injection molding a resin, and the coil is also integrally molded at the time of injection molding. In addition, the member for connecting both units is also a magnetic circuit member, and is provided integrally or separately on the electronic control unit side as a means of eliminating an airtight means on the connecting surfaces of both units and an airtight means around the circuit board housing space of the electronic control unit containing the coil, and thus also eliminating the assembly steps therefor.

Embodiment

A preferred embodiment of the present invention thus comprised is described in detail below with reference to the accompanying figures.

Figure 1:
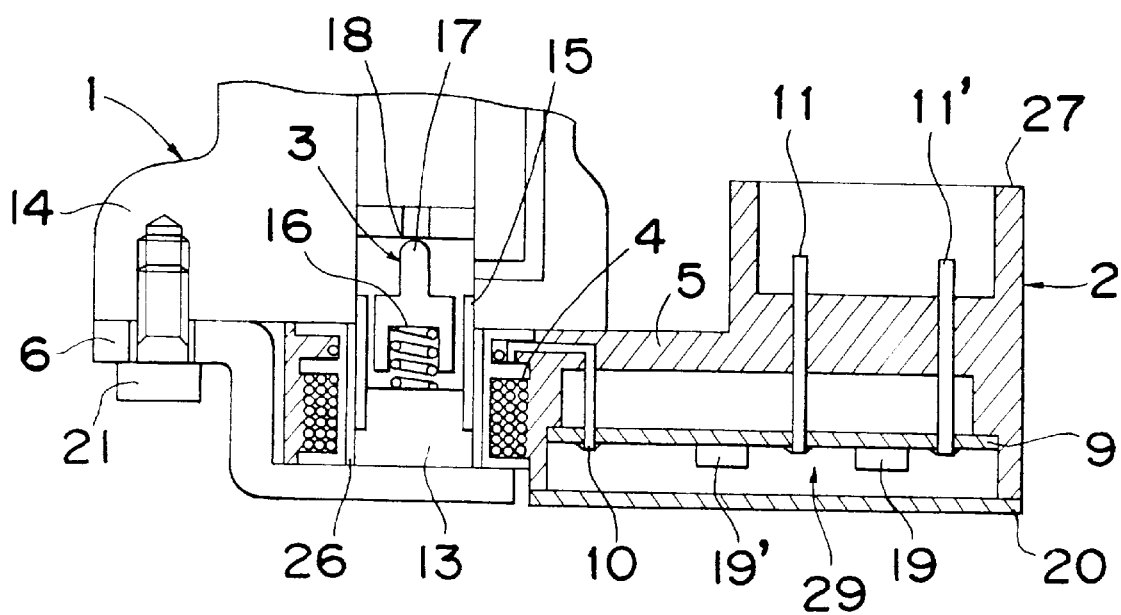
FIG. 1 is a structural diagram of a first embodiment of the present invention.

FIG. 1 is a structural diagram of a first embodiment of the present invention. As shown in FIG. 1 an electronic control unit 2 comprises a circuit board 9 on which electronic component groups 19 and 19' are mounted, a coil 4, connector terminal groups 11 and 11' for connection to a vehicle harness, a resin case 5, and a cover 20.

A hydraulic control unit 1 constitutes part of a solenoid valve 3, which does not contain the coil 4 and comprises a housing 14 made from a magnetic material, a stationary core 13, a ring 15 made from a non-magnetic material, a moving core 17 with a valve body, a valve seat 18 fixed to the housing 14, and a spring 16. Note that one of each of the preceding components is shown in FIG. 1.

Figure 2:
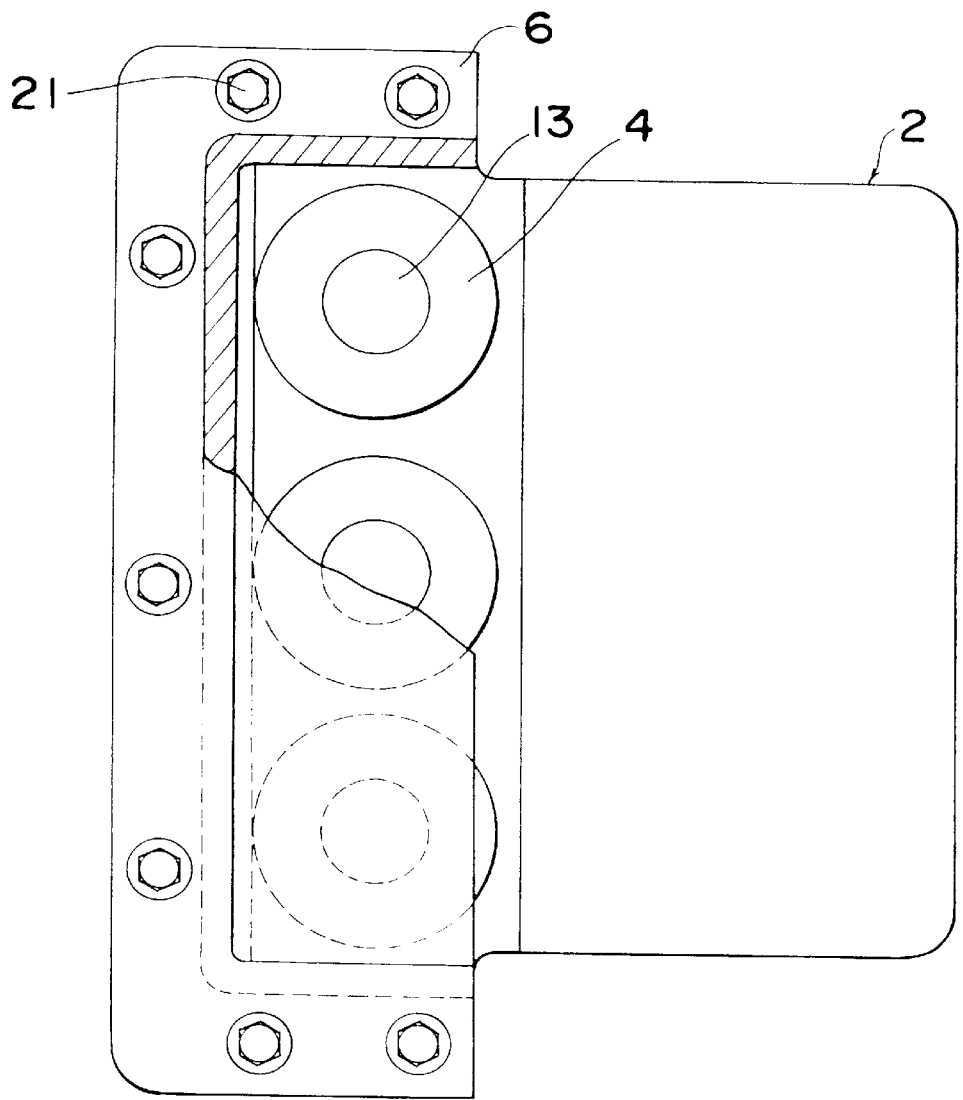
FIG. 2 is an assembly diagram showing the relationship between the electronic control unit and magnetic parts of the first embodiment of the present invention.

A magnetic member 6 shown in FIG. 1 and FIG. 2 is fastened to the hydraulic control unit 1 by means of a bolt 21.

A manufacturing process used to produce the present invention described above is described briefly more specifically below.

As shown in FIG. 1, the hydraulic control unit 1 is assembled with the stationary core 13 and ring 15, and the ring 15 and housing 14, press fit to a fluid tight seal so that the end of the stationary core 13 is at a height that is even with the inside surface of the L-shaped curve in the magnetic member 6. As a result, no further waterproof structure is necessary.

The magnetic circuit for driving the solenoid valve of this hydraulic control apparatus comprises the moving core 17, stationary core 13, magnetic member 6, and housing 14, and is closed around the inside and outside circumferences of the coil 4. The gap between the seat of the magnetic member 6 and the housing 14, and between the magnetic member 6 and the stationary core 13, can be ignored. It can be ignored because the height that the parts forming the magnetic circuit of the solenoid valve 3 on the hydraulic control unit 1 side project above the connecting surface matches the height of the inside surface of the L-shaped curve of the magnetic member 6. The performance of the solenoid valve is thus not impaired.

Positioning precision error when a plurality of olenoid valves are provided can be absorbed by providing a gap 26 on the inside circumference of the coil. Providing such a gap also results in substantially no impairment of the performance of the coil as an electromagnet.

The method of molding the resin case 5 is described in further detail below.

Figure 3:
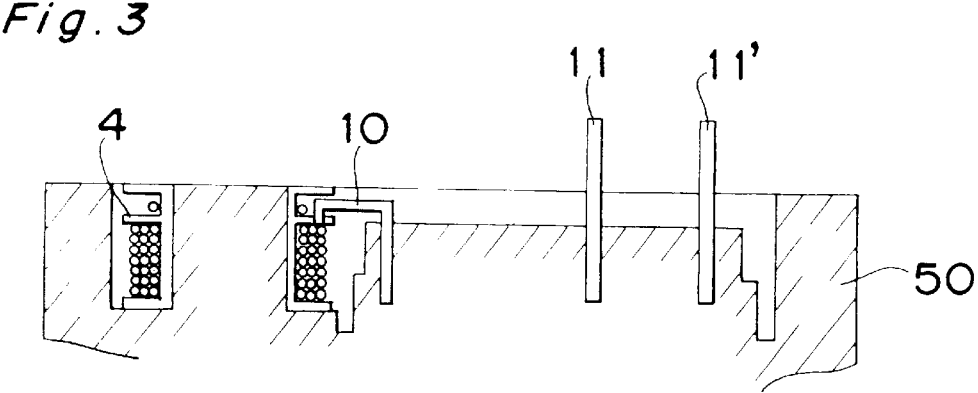
FIG. 3 shows a first stage in the production of the electronic control unit of the first embodiment of the present invention.
Figure 4:
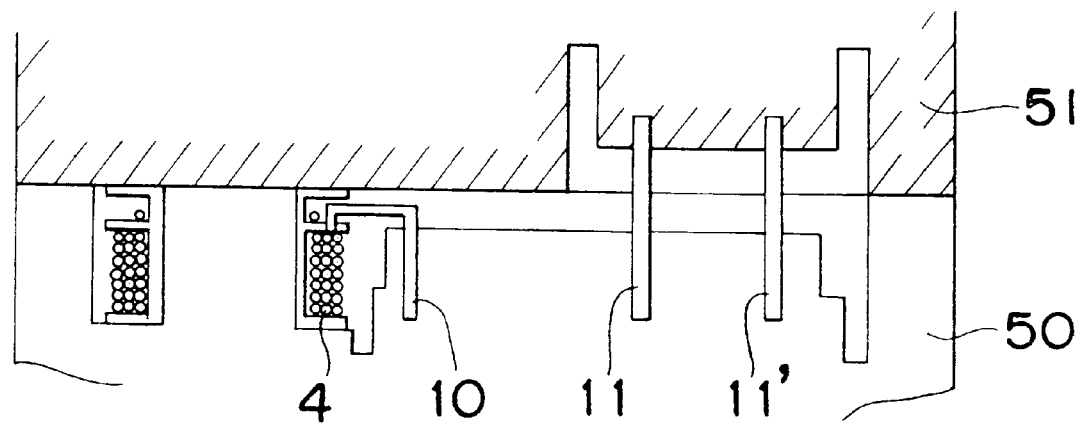
FIG. 4 shows a second stage in the production of the electronic control unit of the first embodiment of the present invention.

Shown in FIG. 3 is a bottom mold 50. A pin 10 for connecting the coil 4, and vehicle harness connector terminal groups 11 and 11', are inserted into the bottom mold and the mold is then closed with a top mold 51 as shown in FIG. 4.

It should be noted that the "top" and "bottom" references described above are used solely for the convenience of referring to the orientation [of the hydraulic control apparatus] shown in FIG. 1, and do not specify any particular top and bottom arrangement of the molds during molding.

A circuit board 9 is then mounted to the case assembly completed as shown in FIG. 1. The electronic component groups 19 and 19', connecting pin 10 for the coil 4, and vehicle harness connector terminal groups 11 and 11' are electrically connected. The connecting pin 10 and connector terminal groups 11 and 11' are constrained by the mold and positioned by integral molding, and can be easily passed through the connector holes of the circuit board 9. While the cover 20 is attached after this, a completely waterproof enclosure can be easily formed inside the resin case 5 at this time by welding the cover 20 or using a similar method.

After the circuit board 9 is mounted in the resin case 5, the electronic component groups 19 and 19' of the circuit board 9 are electrically connected to the connecting pin 10 projecting from the coil 4 into the circuit board housing space 29 and to the connector terminal groups 11 and 11'. At this point there are no electrical circuit parts exposed at the connection surface to the hydraulic control unit 1, and no further waterproof structure for this surface is therefore needed.

The electronic control unit 2 is then fitted to the magnetic member 6, and fastened to the hydraulic control unit 1 by a bolt 21. Note that it is not necessary to insertion mold a metal collar or similar separate member to bear the axial force of the bolt 21 because the face against which the bolt 21 pulls is the high hardness magnetic member 6 rather than a low hardness member such as the resin case 5.

Conventionally when a plurality of coils is disposed, an insulation layer is provided around the coil, and the insulation layer is then clad with a magnetic material (this corresponds to the steel jacket 121 described in the prior art above). These elements have conventionally also limited the pitch between the multiple coils. With the magnetic circuit construction of the present invention, however, the plural coils 4 can be disposed almost at the outside diameter of the coil layer, and the [overall unit] size can therefore be reduced. In addition, the molding surrounding the plurality of coils 4 can also be integrally formed, thereby strengthening the overall structure when compared with individually molding each of the coils 4.

When it is difficult to use the same material for the resin case and the molding protecting the outside of the coil winding, it is possible to use a subassembly first prepared with a resin molding for protecting the outside of the coil winding.

Figure 5:
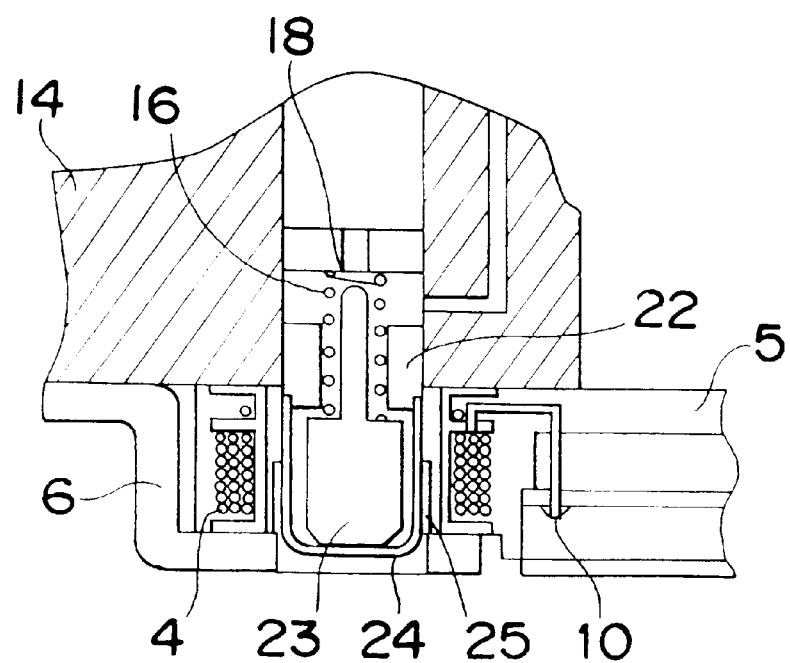
FIG. 5 is a partial structural diagram of a first embodiment of the present invention when a normally open solenoid valve is disposed on the hydraulic control unit side.

It should be further noted that while the invention has been described with reference to a normally closed solenoid valve, a normally open solenoid valve can be used as shown in FIG. 5. In FIG. 5 the stationary core 22 is on top, the moving core 23 is on the bottom, and the moving core 23 is enclosed in a tube 24 of a non-magnetic material. A yoke 25 for a magnetic circuit is preferably press fit around the tube 24.

Figure 6:
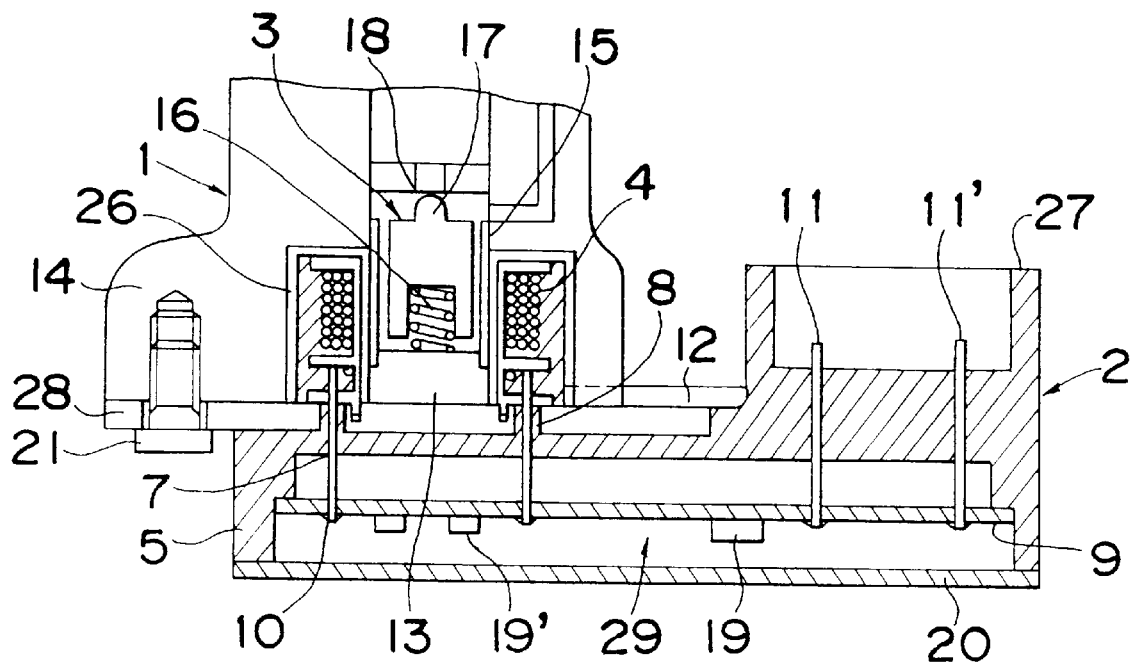
FIG. 6 is a structural diagram of a second embodiment of the present invention.

FIG. 6 is a structural diagram of a second embodiment of the present invention. Note that like parts are referenced with like numbers in the first embodiment described above and in the second embodiment shown in FIG. 6. As shown in FIG. 6 an electronic control unit 2 comprises a circuit board 9 on which electronic component groups 19 and 19' are mounted. The electronic control unit also comprises a coil 4, magnetic plate 28, connector terminal groups 11 and 11' for connection to a vehicle harness, a resin case 5, and a cover 20.

A hydraulic control unit 1 constitutes part of a solenoid valve 3, which does not contain the coil 4 and comprises a housing 14 made from a magnetic material, a stationary core 13, a ring 15 made from a non-magnetic material, a moving core 17 with a valve body, a valve seat 18 fixed to the housing 14, and a spring 16. Note that one of each of the preceding components is shown in FIG. 6.

The electronic control unit 2 is fastened to the hydraulic control unit 1 by means of a bolt 21.

A manufacturing process used to produce the structure described above is described briefly in detail below.

The hydraulic control unit 1 is assembled with the stationary core 13 and ring 15, and the ring 15 and housing 14, press fit to a fluid tight seal so that the end of the stationary core 13 is flush with the end of the housing 14. As a result, no further waterproof structure is necessary.

The magnetic circuit for driving the solenoid valve of this hydraulic control apparatus comprises the moving core 17, stationary core 13, magnetic plate 28, and housing 14, and is closed around the inside and outside circumferences of the coil 4. The gap between the magnetic plate 28 and the housing 14, and between the magnetic plate 28 and the stationary core 13, can be ignored because the end of the stationary core 13 on the hydraulic control unit 1 side is flush with the end of the housing 14. The performance of the solenoid valve is thus not impaired.

While only one solenoid valve and one bolt 21 are described above, it will be obvious that a plurality of these can be provided as necessary. Positioning precision error when a plurality of solenoid valves is provided can be absorbed by providing a gap 26 on the inside and outside circumferences of the coil. Providing such a gap also results in substantially no impairment of the performance of the coil as an electromagnet.

The method of molding the resin case 5 is described next in further detail below.

Figure 7:
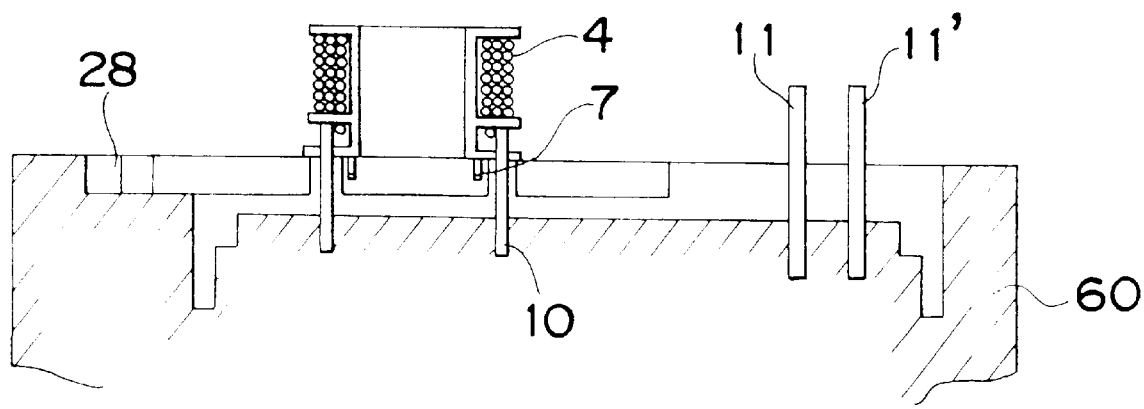
FIG. 7 shows a first stage in the production of the electronic control unit of the second embodiment of the present invention.

Shown in FIG. 7 is a bottom mold 60. A magnetic plate 28 is placed on the bottom mold 60, and vehicle harness connector terminal groups 11 and 11', are inserted. It should be noted that the "bottom mold" reference above is used solely for the convenience of referring to the orientation of the hydraulic control apparatus shown in FIG. 6, and does not specify any particular top or bottom arrangement of the mold during molding.

The coil 4 is then set in position. The coil 4 is substantially positioned by inserting the connecting pin 10 of the coil 4 to the bottom mold 60, and is then accurately positioned by fitting into the recess 7 in the top of the magnetic plate 28.

Figure 8:
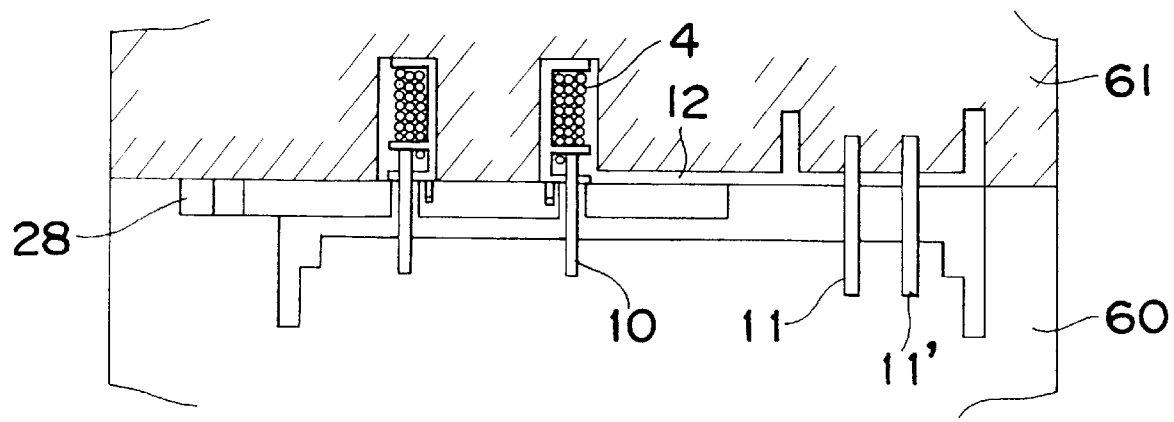
FIG. 8 shows a second stage in the production of the electronic control unit of the second embodiment of the present invention.

The mold is then closed as shown in FIG. 8. The magnetic plate 28 is constrained at the bottom mold 60 by the outside circumference part, and at the top mold 61 by the entire inside surface of the coil 4 and by part of the outside of the coil 4, and is thus firmly secured inside the mold.

The coil 4 is constrained by the top mold 61 on the inside and outside circumference and top sides, and by the magnetic plate 28 on the bottom. Because the coil 4 is accurately positioned to the magnetic plate 28 before the mold is closed, the coil 4 will not be crushed by the top mold 61 when the mold is closed. The connector terminal groups 11 and 11' are also constrained by the bottom mold 60 and top mold 61.

The resin case 5 is next injection molded as shown in FIG. 6. A resin molding for protecting the outside of the coil 4 is also formed at this time, and a hood 27 for a vehicle connector is also formed. As a result, the vehicle harness connector terminal groups 11 and 11' and the connecting pin 10 projecting from the coil 4 into the circuit board housing space 29 are accurately positioned by the bottom mold 60 with the waterproof structure inside the resin case 5 retained.

After the circuit board 9 is mounted to the resin case 5, it is electrically connected to the connecting pin 10 and to the connector terminal groups 11 and 11'. If the resin case 5 and cover 20 are sealed by welding or other method, a completely waterproof structure can be achieved inside the resin case 5. At this point there are no electrical circuit parts exposed at the connection surface to the hydraulic control unit 1, and no further waterproof structure for this surface is therefore needed.

If the connecting pin 10 of the coil 4 reaches the circuit board housing space 29 by passing through a hole 8 provided in the magnetic plate 28, and the connecting pin 10 is completely covered with resin other than at the part exposed to the circuit board housing space 29, no further waterproof structure or insulation structure is needed for the winding or the overall coil 4. The gate supplying resin is disposed below the magnetic plate 28 in order to mold the resin case 5 first, and then resin is supplied to the outside of the coil 4. As a result, part of the top of the magnetic plate 28 is preferably formed as a resin channel 12.

The magnetic plate 28 is also constrained by the top mold 61. As a result, the part not covered by resin during molding can be used in a magnetic circuit.

The circuit board 9 is then mounted to the completed case subassembly, and the electronic component groups 19 and 19', connecting pin 10 of the coil 4, and vehicle harness connector terminal groups 11 and 11' are electrically connected. Because the connecting pin 10 and vehicle harness connector terminal groups 11 and 11' are constrained by the mold and positioned by integral molding, they can be passed easily through the connecting holes in the circuit board 9. While the cover 20 is installed after this, a completely watertight enclosure can be easily formed inside the resin case 5 at this time by welding the cover 20 or using a similar method.

The last step is to fasten the electronic control unit 2 to the hydraulic control unit 1 with a bolt 21. The part of the magnetic plate 28 constrained by the bottom mold 60 and top mold 61 at top and bottom is preferably used as the bolt seat. In this manner the surface contacting the bolt 21 is the high hardness magnetic plate 28 rather than a low hardness member such as the resin case 5, and it is therefore not necessary to insertion mold a metal collar or similar separate member to bear the axial force of the bolt 21.

Conventionally when a plurality of coils is disposed, an insulation layer is provided around the coil and the insulation layer is then clad with a magnetic material (this corresponds to the steel jacket 121 described in the prior art). These elements have conventionally also limited the pitch between the plural coils. With the magnetic circuit construction of the present invention, however, plural coils 4 can be disposed almost at the outside diameter of the coil layer, and the [overall unit] size can therefore be reduced. In addition, the molding surrounding the plurality of coils 4 can be integrally formed, thereby strengthening the overall structure when compared with individually molding each of the coils 4.

It should be noted that while the above embodiment has been described using a housing 14 made from a magnetic material as part of a magnetic circuit, the housing itself does not need to be of a magnetic material, and one or a plurality of members of a magnetic material can be provided passing from the magnetic plate 28 through the coil 4 to moving core 17 to close a magnetic circuit.

When it is difficult to use the same material for the resin case and the molding protecting the outside of the coil winding, it is possible to use a subassembly first prepared with a resin molding for protecting the outside of the coil winding.

Furthermore, when securely holding the magnetic plate 28 inside the mold is more important than a waterproof structure, the back of the coil member can be supported by the mold.

Figure 9:
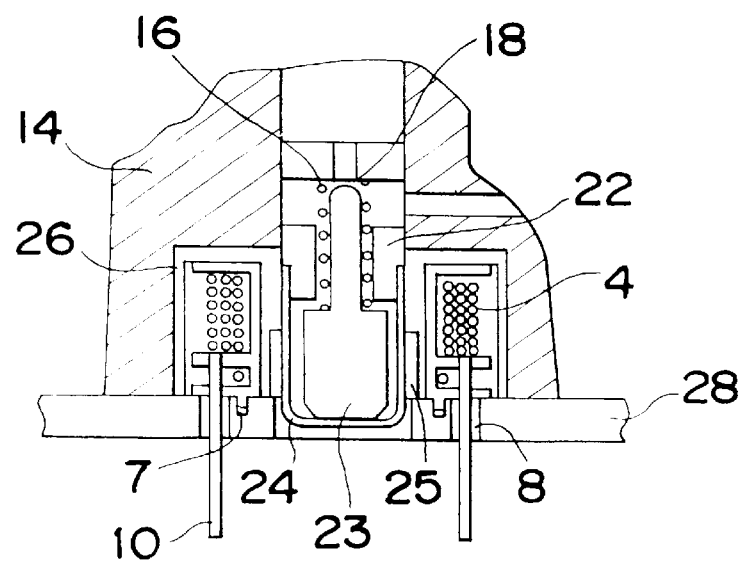
FIG. 9 is a partial structural diagram of a second embodiment of the present invention when a normally open solenoid valve is disposed on the hydraulic control unit side.

It should be further noted that while the invention has been described with reference to a normally closed solenoid valve, a normally open solenoid valve can be used as shown in FIG. 9. Note, further, that the structure of the normally open solenoid valve shown in FIG. 9 is identical to that shown in FIG. 5.

Figure 10:
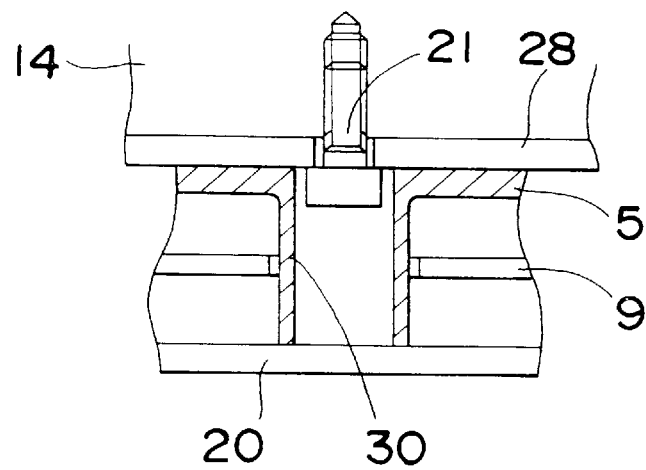
FIG. 10 is a partial structural diagram of a second embodiment of the present invention when a bolt seat is disposed in the middle of a magnetic plate of the second embodiment of the present invention.

Furthermore, while the bolt 21 has been described as being disposed near the outside circumference, it can also be disposed in the middle as shown in FIG. 10. In this case a hole is opened in the circuit board 9, a wall surface 30 containing the bolt hole is provided in the resin case 5, and the wall surface 30 is also welded to the cover 20 when the covor 20 is welded in place. As a result, a bolt 21 can be provided in the middle without departing from the scope of the present invention.

Figure 11:
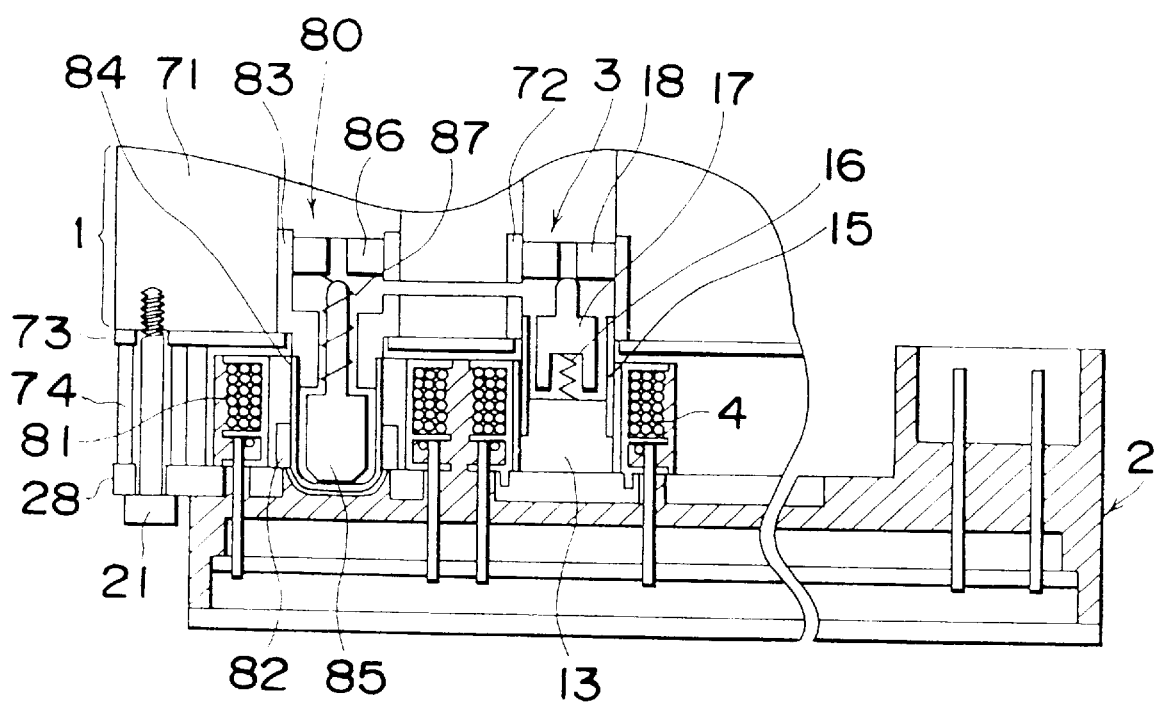
FIG. 11 is a structural diagram of a third embodiment of the present invention.

FIG. 11 shows a third embodiment of the present invention.

While the housing of the hydraulic control unit, and more specifically the part housing the components of the solenoid valve, can be made from a magnetic material, a non-magnetic light metal is commonly used to reduce the weight. The third embodiment of the present invention specifies the structure of a hydraulic control unit suitable for use in combination with the electronic control unit of the second embodiment when the housing is a non-magnetic material.

The housing 71 of the hydraulic control unit 1 is made from a non-magnetic material. One normally-closed solenoid valve 3 not containing a coil 4 comprises a yoke 72 made from a magnetic material, a second magnetic plate 73 made from a magnetic material, a stationary core 13, a ring 15, a moving core 17 with a valve body, a valve seat 18 fixed to the yoke 72, and a spring 16. Note that one of each of these components is shown in FIG. 11.

One normally-open solenoid valve 80 likewise not containing a coil 81 comprises a yoke 82 made from a magnetic material, a second magnetic plate 73 made from a magnetic material, a stationary core 83, a ring 84 made from a non-magnetic material, a moving core 85 with a valve body, a valve seat 86 fixed to the moving core 83, and a spring 87. Note that one of each of these components is shown in FIG. 11.

The electronic control unit 2 and hydraulic control unit 1 are fastened together by a bolt 21 with a collar 74 made from a magnetic material. The magnetic circuit of a normally closed solenoid valve of this hydraulic control apparatus comprises the moving core 17, stationary core 13, magnetic plate 28, collar 74, second magnetic plate 73, and yoke 72.

To distinguish it from the second magnetic plate 73, magnetic plate 28 is referred to hereafter below as a first magnetic plate 28.

The magnetic circuit of a normally open solenoid valve comprises a stationary core 83, moving core 85, yoke 82, first magnetic plate 28, collar 74, and second magnetic plate 73.

By thus using the first magnetic plate 28, collar 74, and second magnetic plate 73, i.e., common parts that are each separated from the solenoid valve, to form part of the magnetic circuits, it is not necessary to dispose these magnetic materials around each of the coils 4 when a plurality of solenoid valves is provided.

Even more particularly, if structured so that the current flows in opposite directions through adjacent coils, the size of the magnetic circuit part formed by these common parts can be reduced. This is described below using by way of example an antilock brake system for a four wheel vehicle in which a total of eight solenoid valves, including one normally closed solenoid valve and one normally open solenoid valve for each wheel, is used for the control valves.

This type of antilock brake system is known to operate in three modes: a pressurize mode in which no current flows to either solenoid valve; a hold mode in which current flows only to the normally open solenoid valve; and a depressurize mode in which current flows to both solenoid valves. In other words, when current flows to a normally closed solenoid valve, current also always flows to the corresponding normally open solenoid valve.

Figure 12:
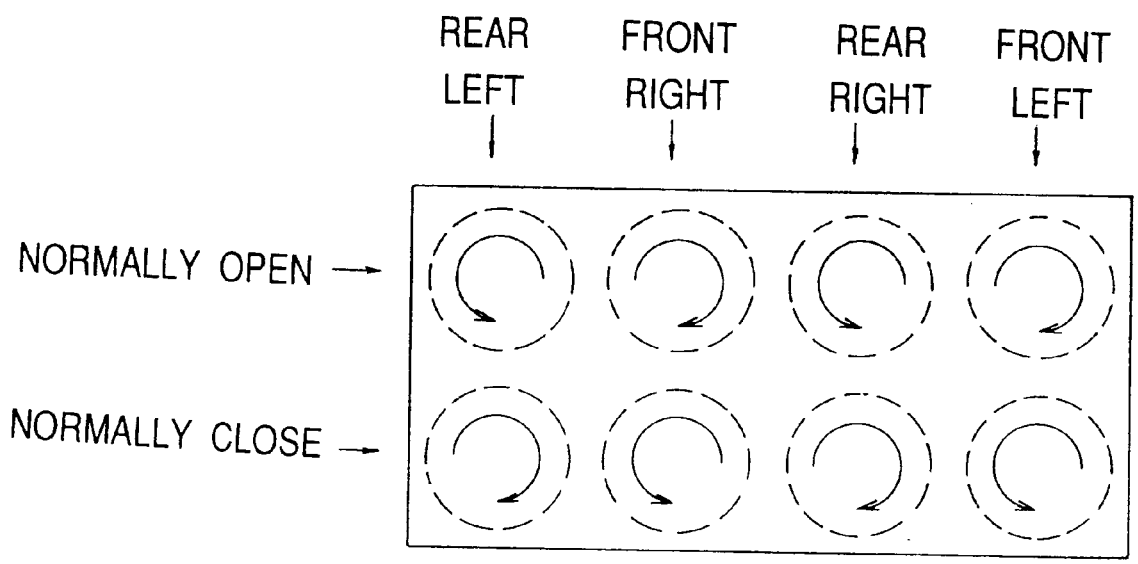
FIG. 12 shows the electric current around the coils by the normally open solenoid valves and normally closed solenoid valves in the third embodiment of the present invention.
Figure 13:
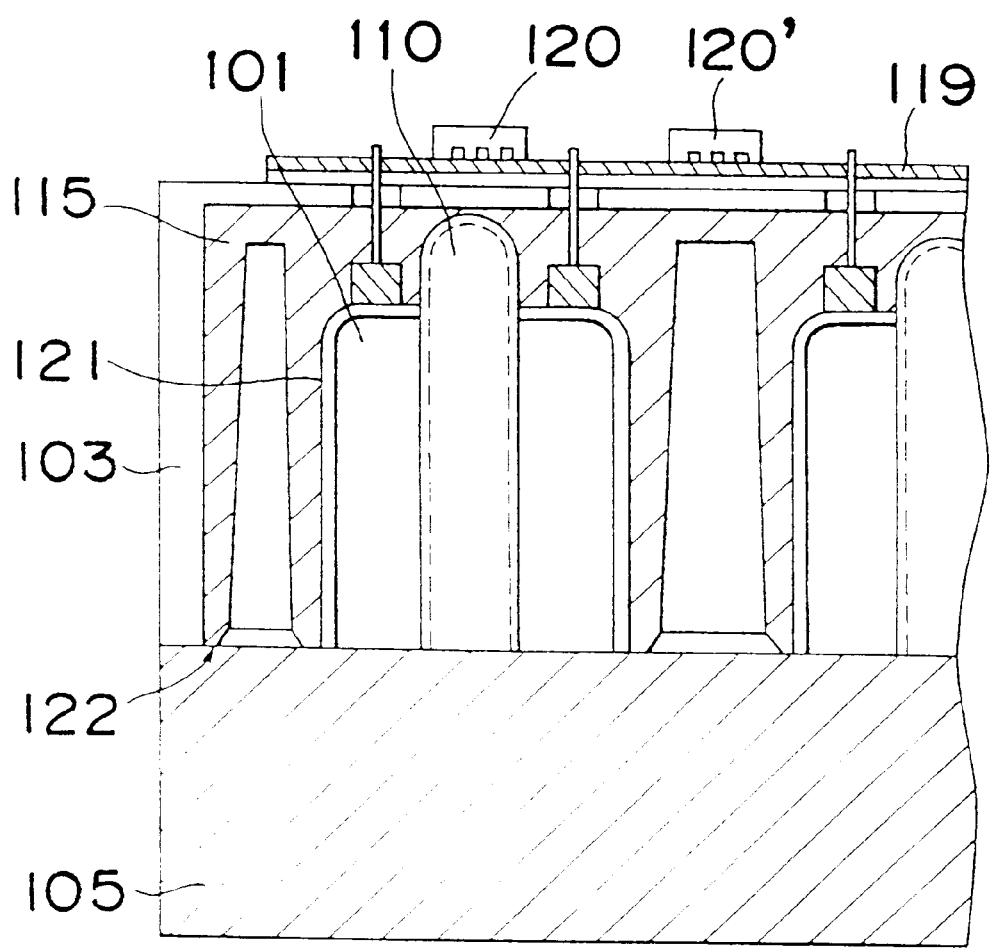
FIG. 13 is a cross sectional diagram showing the connections around a solenoid valve according to the prior art.

As shown in FIG. 12, if the current flow through the coils of the normally open solenoid valves is the same in, for example, the right front and right rear wheels, then current flows in the opposite direction through the coils of the left front and left rear wheels. In addition, the current flow in the coil of a normally closed solenoid valves is opposite that of the corresponding normally open solenoid valve. As a result, if the break presure for both right wheels is held simultaneously, i.e., if current flows to the normally open solenoid valves for both right wheels, the fields generated by both valves have the same alignment, and the magnetic circuit part formed by the above common parts must have a magnetic circuit area sufficient for two coils. However, if current is supplied to the normally open solenoid valves for all four wheels, the fields generated by the valves will cancel each other out outside the coil, and a magnetic field will not be produced in the magnetic circuit part formed by the common parts, particularly in collar 74. Moreover, when current is supplied to a normally closed solenoid valve, current is also always supplied to the corresponding normally open solenoid valve. As a result, the field generated by the normally closed solenoid valve around the coil is always cancelled by the field generated by the normally open solenoid valve.

The magnetic circuit area of the magnetic circuit part formed by the above common parts must therefore only be large enough for two coils, and when compared with an apparatus in which a steel jacket is used around each solenoid valve, can be reduced to ¼. To avoid magnetic saturation of the first magnetic plate 28 and second magnetic plate 73, the coil current preferably flows in opposite directions in adjacent coils with an approximately equal distribution of current flow in both directions.

It should be noted that while the third embodiment above has been described in combination with the second embodiment, it can also be easily achieved in combination with the first embodiment.

In a hydraulic control apparatus according to a first embodiment of the present invention, a coil of a solenoid valve is integrally molded with a resin case of an electronic control unit, and solenoid valve parts disposed to a hydraulic control unit are inserted to a through hole in the middle of the coil. Magnetec members with the electronic control unit disposed therebetween are attached, and a coil forming part of the magnetic circuit of the solenoid valve is integrally molded with the resin case of the electronic control unit. As a result, a separate subassembly process is not needed because of the solenoid valve construction.

A water resistant structure in which the area around the coil connecting pin is covered with resin in this integrated molding process can also be easily achieved. This can improve reliability in addition to yielding cost benefits. If the outside of the winding is also molded at this time, another step in the coil production process can be eliminated, thus yielding further cost benefits.

Because a resin molded construction is used for the entire circuit board housing space in particular, the reliability of the waterproof structure of the circuit board housing space is high.

In a hydraulic control apparatus according to a second embodiment of the present invention, the coil is placed on a magnetic plate and integrally molded at the same time the resin case of the electronic control unit is molded. As a result, a separate subassembly process is not needed because of the solenoid valve construction. A water resistant structure in which the area around the coil connecting pin is covered with resin in this integrated molding process can be achieved. The outside of the winding can also be molded at this time reliability can thus be improved and cost is reduced as in the first embodiment above.

Furthermore, resin is not injected where the magnetic plate is held when the magnetic plate is integrally molded. This part can be actively used in a magnetic circuit. The part of the magnetic plate extending outside the circuit board housing space is outside the waterproof structure, and can be used for placing bolt holes for attachment. In particular, because a resin molded structure is used throughout the circuit board housing space, slight separation between the resin and magnetic plate as a result of, for example, thermal hysteresis, there is absolutely no effect on the waterproof structure, and a high reliability circuit board housing space can be achieved.

Furthermore, a plurality of coils 4 can be arranged at almost the outside diameter of the winding, thereby reducing size. A surrounding molding for a plurality of coils 4 can also be integrally molded, thereby strengthening the overall structure when compared with individually molding each of the coils 4.

Moreover, common magnetic circuit parts can also be used as connecting members of the hydraulic control unit and electronic control unit. By further reversing the direction of current flowing to adjacent coils with an approximately equal distribution of current flow in both directions, the fields generated by each of the coils can be mutually cancelling. As a result, the common magnetic circuit parts can be made smaller, and the size and cost of the apparatus can be reduced.

Although the present invention has been fully described in connection with the preferred embodiment thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A hydraulic control apparatus including a hydraulic control unit containing a solenoid valve and an electronic control unit having a circuit board, the electronic control unit controlling said hydraulic control unit, the electronic control unit being integral with the hydraulic control unit, the hydraulic control apparatus comprising:

a hydraulic circuit portion of a solenoid valve provided on the hydraulic control unit side, and a coil of the solenoid valve provided on the electronic control unit side, wherein said coil is integral with a resin case on the electronic control unit side, and a hydraulic circuit part of the solenoid valve on the hydraulic control unit side extends into a hole extending through a middle of the coil of the solenoid valve, forming a closed magnetic circuit of a solenoid valve;

wherein a magnetic member is attached at a side of the hydraulic control unit, with the electronic control unit positioned between the magnetic member and the hydraulic control unit, said magnetic member contacts the hydraulic circuit portion of the solenoid valve which extends from the outside of the electronic control unit to form a hydraulic control unit magnetic circut.

2. The hydraulic control apparatus according to claim 1 wherein an attaching part is provided on the magnetic member for fastening to the hydraulic control unit.

3. A hydraulic control apparatus including a hydraulic control unit containing a solenoid valve and an electronic control unit that controls said hydraulic control unit, the electronic control unit being integral with the hydraulic control unit, the hydraulic control apparatus comprising:

a hydraulic circuit portion of a solenoid valve provided on the hydraulic control unit side, and a coil of the solenoid valve provided on the electronic control unit side, wherein said coil is integral with a resin case on the electronic control unit side, and a hydraulic circuit part of the solenoid valve on the hydraulic control unit side extends into a hole extending through a middle of the coil of the solenoid valve, forming a closed magnetic circuit of a solenoid valve;

wherein a magnetic plate forming part of the magnetic circuit of the solenoid valve and the coil mounted on the magnetic plate are formed integrally with the resin case of the electronic control unit, a circuit board housing space is formed in the resin case on the opposite side of the coil, and the magnetic plate is exposed where resin is not molded on part of said magnetic plate.

4. The hydraulic control apparatus according to claim 3 wherein all parts of conductive terminals of the solenoid valve coil are coated with resin, except for end parts of vehicle harness connector terminals and a circuit board connecting pin projecting into the circuit board housing space inside the resin case.

5. The hydraulic control apparatus according to claim 3 wherein an attaching part for fastening to the hydraulic control unit is formed on part of the magnetic plate extending outside the circuit board housing space.

6. The hydraulic control apparatus according to claim 5 wherein all parts of conductive terminals of the solenoid valve coil are coated with resin, except for end parts of vehicle harness connector terminals and a circuit board connecting pin projecting into a circuit board housing space inside the resin case.

7. A hydraulic control apparatus having a plurality of solenoid valves and a respective moving part of each of said plurality of solenoid valves formed on a hydraulic control unit side, and a coil of the solenoid valve formed on an electronic control unit side, said apparatus comprising a hydraulic control unit containing a solenoid valve and an electronic control unit for controlling said hydraulic control unit, wherein a first and a second magnetic plate forming common parts of a magnetic circuit for said plurality of solenoid valves, said first and second magnetic plates positioned on the hydraulic control unit side end surface and on the opposite end surface of the solenoid valve coil, and the first and second magnetic plates are connected to the hydraulic control unit with a magnetic member disposed between the first and second magnetic plates.

8. A hydraulic control apparatus having a moving part of a solenoid valve formed on a hydraulic control unit side, and a coil of the solenoid valve formed on an electronic control unit side, said apparatus comprising a hydraulic control unit containing a solenoid valve and an electronic control unit for controlling said hydraulic control unit, wherein a first and a second magnetic plate forming common parts of a magnetic circuit for a plurality of solenoid valves, said first and second magnetic plates positioned on the hydraulic control unit side end surface and on the opposite end surface of the solenoid valve coil, and the first and second magnetic plates are connected to the hydraulic control unit with a magnetic member disposed between the first and second magnetic plates wherein the hydraulic control apparatus comprises a plurality of coils such that the direction of current flow through adjacent coils is mutually opposite.

9. A hydraulic control apparatus including a hydraulic control unit containing a solenoid valve and an electronic control unit that controls said hydraulic control unit, the electronic control unit being integral with the hydraulic control unit, the hydraulic control apparatus comprising:

a hydraulic circuit portion of a solenoid valve provided on the hydraulic control unit side, and a coil of the solenoid valve provided on the electronic control unit side, wherein said coil is integral with a resin case on the electronic control unit side, and a hydraulic circuit part of the solenoid valve on the hydraulic control unit side extends into a hole extending through a middle of the coil of the solenoid valve, forming a closed magnetic circuit of a solenoid valve;

wherein a magnetic member is attached at a side of the hydraulic control unit, with the electronic control unit positioned between the magnetic member and the hydraulic control unit, said magnetic member contacts the hydraulic circuit portion of the solenoid valve which extends from the outside of the electronic control unit to form a hydraulic control unit magnetic circuit;

wherein all parts of conductive terminals of the solenoid valve coil are coated with resin, except for end parts of vehicle harness connector terminals and a circuit board connecting pin projecting into a circuit board housing space inside the resin case.

10. A hydraulic control apparatus including a hydraulic control unit containing a solenoid valve and an electronic control unit for controlling said hydraulic control unit, the electronic control unit being integral with the hydraulic control unit, the hydraulic control apparatus comprising:

a hydraulic circuit portion of a solenoid valve provided on the hydraulic control unit side, and a coil of the solenoid valve provided on the electronic control unit side, wherein said coil is integral with a resin case on the electronic control unit side, and a hydraulic circuit part of the solenoid valve on the hydraulic control unit side extends into a hole extending through a middle of the coil of the solenoid valve, forming a closed magnetic circuit of a solenoid valve;

wherein all parts of the conductive terminals of the solenoid valve coil are coated with resin, except for end parts of a plurality of vehicle harness connector terminals and a circuit board connecting pin projecting into a circuit board housing space inside the resin case.

11. A hydraulic control apparatus including a hydraulic control unit containing a solenoid valve and an electronic control unit that controls said hydraulic control unit, the electronic control unit being integral with the hydraulic control unit, the hydraulic control apparatus comprising:

a hydraulic circuit portion of a solenoid valve provided on the hydraulic control unit side, and a coil of the solenoid valve provided on the electronic control unit side, wherein said coil is integral with a resin case on the electronic control unit side, and a hydraulic circuit part of the solenoid valve on the hydraulic control unit side extends into a hole extending through a middle of the coil of the solenoid valve, forming a closed magnetic circuit of a solenoid valve;

wherein a magnetic member is attached at a side of the hydraulic control unit, with the electronic control unit positioned between the magnetic member and the hydraulic control unit, said magnetic member contacts the hydraulic circuit portion of the solenoid valve which extends from the outside of the electronic control unit to form a hydraulic control unit magnetic circuit, wherein an attaching part is provided on the magnetic member for fastening to the hydraulic control unit, wherein all parts of conductive terminals of the solenoid valve coil are coated with resin, except for end parts of vehicle harness connector terminals and a circuit board connecting pin projecting into a circuit board housing space inside the resin case.

* * * * *